United States Patent
Hormati et al.

(10) Patent No.: US 9,444,654 B2
(45) Date of Patent: Sep. 13, 2016

(54) MULTIDROP DATA TRANSFER

(71) Applicant: Kandou Labs SA, Lausanne (CH)

(72) Inventors: Ali Hormati, Ecublens Vaud (CH);
Amin Shokrollahi, Preverenges (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 14/803,996

(22) Filed: Jul. 20, 2015

(65) Prior Publication Data

US 2016/0020796 A1 Jan. 21, 2016

Related U.S. Application Data

(60) Provisional application No. 62/026,860, filed on Jul. 21, 2014.

(51) Int. Cl.
*H04B 1/10* (2006.01)
*H04L 25/02* (2006.01)
*G06F 13/38* (2006.01)

(52) U.S. Cl.
CPC ........... *H04L 25/0272* (2013.01); *G06F 13/38* (2013.01)

(58) Field of Classification Search
CPC ................ H04L 25/03038; H04L 27/2647
USPC ......................... 375/350, 316, 346
See application file for complete search history.

(56) References Cited

U.S. PATENT DOCUMENTS

| | | |
|---|---|---|
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara et al. |
| 4,181,967 A | 1/1980 | Nash et al. |
| 4,206,316 A | 6/1980 | Burnsweig et al. |
| 4,276,543 A | 6/1981 | Miller |
| 4,486,739 A | 12/1984 | Franaszeck et al. |
| 4,499,550 A | 2/1985 | Ray et al. |

(Continued)

FOREIGN PATENT DOCUMENTS

| | | |
|---|---|---|
| CN | 101478286 | 7/2009 |
| EP | 2039221 B1 | 3/2009 |

(Continued)

OTHER PUBLICATIONS

Notification of Transmittal of the International Search Report and the Written Opinion of the International Searching Authority, or the Declaration, for PCT/US2015/041161, dated Oct. 7, 2015, 8 pages.

(Continued)

*Primary Examiner* — Helene Tayong
(74) *Attorney, Agent, or Firm* — Invention Mine LLC (57) ABSTRACT

Multi-drop communications channels can have significantly deep notches in their frequency response causing a corresponding limitation of the effective data transmission rate. A special time-ordered coding method is described which results in the emitted spectrum of the data stream transmitted into the channel having a notch at the same frequency as the notch in the channel frequency response, permitting channel receivers to successfully decode the transmitted data stream. The described coding method may be applied at various multiples of the channel notch frequency to support different throughput rates, and may be combined with other coding techniques such as group or vector signaling codes.

23 Claims, 7 Drawing Sheets

(56) References Cited

U.S. PATENT DOCUMENTS

| | | |
|---|---|---|
| 4,774,498 A | 9/1988 | Traa |
| 4,864,303 A | 9/1989 | Ofek |
| 4,897,657 A | 1/1990 | Brubaker |
| 5,053,974 A | 10/1991 | Penz |
| 5,166,956 A | 11/1992 | Baltus et al. |
| 5,168,509 A | 12/1992 | Nakamura et al. |
| 5,283,761 A | 2/1994 | Gillingham |
| 5,287,305 A | 2/1994 | Yoshida |
| 5,412,689 A | 5/1995 | Chan et al. |
| 5,449,895 A | 9/1995 | Hecht |
| 5,459,465 A | 10/1995 | Kagey |
| 5,511,119 A | 4/1996 | Lechleider |
| 5,553,097 A | 9/1996 | Dagher |
| 5,599,550 A | 2/1997 | Kohlruss et al. |
| 5,659,353 A | 8/1997 | Kostreski et al. |
| 5,802,356 A | 9/1998 | Gaskins |
| 5,825,808 A | 10/1998 | Hershey et al. |
| 5,875,202 A | 2/1999 | Venters |
| 5,945,935 A | 8/1999 | Kusumoto |
| 5,995,016 A | 11/1999 | Perino |
| 6,005,895 A | 12/1999 | Perino et al. |
| 6,084,883 A | 7/2000 | Norrell et al. |
| 6,172,634 B1 | 1/2001 | Leonowich et al. |
| 6,175,230 B1 | 1/2001 | Hamblin et al. |
| 6,232,908 B1 | 5/2001 | Nakaigawa |
| 6,278,740 B1 | 8/2001 | Nordyke |
| 6,346,907 B1 | 2/2002 | Dacy |
| 6,359,931 B1 | 3/2002 | Perino et al. |
| 6,404,820 B1 | 6/2002 | Postol |
| 6,417,737 B1 | 7/2002 | Moloudi et al. |
| 6,452,420 B1 | 9/2002 | Wong |
| 6,483,828 B1 | 11/2002 | Balachandran |
| 6,504,875 B2 | 1/2003 | Perino et al. |
| 6,509,773 B2 | 1/2003 | Buchwald |
| 6,556,628 B1 | 4/2003 | Poulton et al. |
| 6,563,382 B1 | 5/2003 | Yang et al. |
| 6,621,427 B2 | 9/2003 | Greenstreet |
| 6,624,699 B2 | 9/2003 | Yin |
| 6,650,638 B1 | 11/2003 | Walker et al. |
| 6,661,355 B2 | 12/2003 | Cornelius et al. |
| 6,766,342 B2 | 7/2004 | Kechriotis |
| 6,839,429 B1 | 1/2005 | Gaikwald et al. |
| 6,865,234 B1 | 3/2005 | Agazzi |
| 6,865,236 B1 | 3/2005 | Terry |
| 6,954,492 B1 | 10/2005 | Williams |
| 6,990,138 B2 | 1/2006 | Bejjani |
| 6,999,516 B1 | 2/2006 | Rajan |
| 7,023,817 B2 | 4/2006 | Kuffner |
| 7,053,802 B2 | 5/2006 | Cornelius |
| 7,085,153 B2 | 8/2006 | Ferrant et al. |
| 7,142,612 B2 | 11/2006 | Horowitz et al. |
| 7,142,865 B2 | 11/2006 | Tsai |
| 7,167,019 B2 | 1/2007 | Broyde et al. |
| 7,180,949 B2 | 2/2007 | Kleveland et al. |
| 7,184,483 B2 | 2/2007 | Rajan |
| 7,335,976 B2 | 2/2008 | Chen |
| 7,356,213 B1 | 4/2008 | Cunningham et al. |
| 7,358,869 B1 | 4/2008 | Chiarulli et al. |
| 7,362,130 B2 | 4/2008 | Broyde et al. |
| 7,389,333 B2 | 6/2008 | Moore et al. |
| 7,428,273 B2 | 9/2008 | Foster |
| 7,633,850 B2 | 12/2009 | Ahn |
| 7,643,588 B2 | 1/2010 | Visalli |
| 7,656,321 B2 | 2/2010 | Wang |
| 7,697,915 B2 | 4/2010 | Behzad |
| 7,706,524 B2 | 4/2010 | Zerbe |
| 7,746,764 B2 | 6/2010 | Rawlins et al. |
| 7,787,572 B2 | 8/2010 | Scharf et al. |
| 7,841,909 B2 | 11/2010 | Murray |
| 7,869,497 B2 | 1/2011 | Benvenuto |
| 7,882,413 B2 | 2/2011 | Chen et al. |
| 7,933,770 B2 | 4/2011 | Kruger et al. |
| 8,064,535 B2 | 11/2011 | Wiley |
| 8,091,006 B2 | 1/2012 | Prasad et al. |
| 8,106,806 B2 | 1/2012 | Toyomura |
| 8,159,375 B2 | 4/2012 | Abbasfar |
| 8,159,376 B2 | 4/2012 | Abbasfar |
| 8,199,849 B2 | 6/2012 | Oh |
| 8,253,454 B2 | 8/2012 | Lin |
| 8,279,094 B2 | 10/2012 | Abbasfar |
| 8,295,250 B2 | 10/2012 | Gorokhov |
| 8,310,389 B1 | 11/2012 | Chui |
| 8,406,315 B2 | 3/2013 | Tsai |
| 8,429,495 B2 | 4/2013 | Przybylski |
| 8,442,099 B1 | 5/2013 | Sederat |
| 8,442,210 B2 | 5/2013 | Zerbe |
| 8,443,223 B2 | 5/2013 | Abbasfar |
| 8,462,891 B2 | 6/2013 | Kizer et al. |
| 8,498,368 B1 | 7/2013 | Husted |
| 8,520,493 B2 | 8/2013 | Goulahsen |
| 8,547,272 B2 | 10/2013 | Nestler et al. |
| 8,578,246 B2 | 11/2013 | Mittelholzer |
| 8,588,280 B2 | 11/2013 | Oh et al. |
| 8,593,305 B1 | 11/2013 | Tajalli et al. |
| 8,638,241 B2 | 1/2014 | Sudhakaran |
| 8,649,445 B2 | 2/2014 | Cronie |
| 8,649,460 B2 | 2/2014 | Ware et al. |
| 8,718,184 B1 | 5/2014 | Cronie |
| 8,780,687 B2 | 7/2014 | Clausen |
| 8,782,578 B2 | 7/2014 | Tell |
| 8,879,660 B1 | 11/2014 | Peng |
| 8,949,693 B2 | 2/2015 | Ordentlich |
| 8,951,072 B2 | 2/2015 | Hashim |
| 8,989,317 B1 | 3/2015 | Holden |
| 9,036,764 B1 | 5/2015 | Hossain |
| 9,059,816 B1 * | 6/2015 | Simpson et al. |
| 9,069,995 B1 | 6/2015 | Cronie |
| 9,077,386 B1 | 7/2015 | Holden |
| 9,093,791 B2 | 7/2015 | Liang |
| 9,100,232 B1 | 8/2015 | Hormati |
| 9,281,785 B2 | 3/2016 | Sjoland |
| 9,331,962 B2 | 5/2016 | Lida |
| 9,362,974 B2 | 6/2016 | Fox |
| 2001/0006538 A1 | 7/2001 | Simon et al. |
| 2001/0055344 A1 | 12/2001 | Lee et al. |
| 2002/0034191 A1 | 3/2002 | Shattil |
| 2002/0057592 A1 | 5/2002 | Robb |
| 2002/0154633 A1 | 10/2002 | Shin |
| 2002/0163881 A1 | 11/2002 | Dhong |
| 2002/0174373 A1 | 11/2002 | Chang |
| 2003/0071745 A1 | 4/2003 | Greenstreet |
| 2003/0105908 A1 | 6/2003 | Perino et al. |
| 2003/0146783 A1 | 8/2003 | Brandy et al. |
| 2003/0227841 A1 | 12/2003 | Tateishi et al. |
| 2004/0003336 A1 | 1/2004 | Cypher |
| 2004/0003337 A1 | 1/2004 | Cypher |
| 2004/0057525 A1 | 3/2004 | Rajan et al. |
| 2004/0086059 A1 | 5/2004 | Eroz et al. |
| 2004/0156432 A1 | 8/2004 | Hidaka |
| 2005/0057379 A1 | 3/2005 | Jansson |
| 2005/0135182 A1 | 6/2005 | Perino et al. |
| 2005/0152385 A1 | 7/2005 | Cioffi |
| 2005/0174841 A1 | 8/2005 | Ho |
| 2005/0286643 A1 | 12/2005 | Ozawa et al. |
| 2006/0115027 A1 | 6/2006 | Srebranig |
| 2006/0133538 A1 * | 6/2006 | Stojanovic et al. .......... 375/308 |
| 2006/0159005 A1 | 7/2006 | Rawlins et al. |
| 2006/0269005 A1 | 11/2006 | Laroia et al. |
| 2007/0188367 A1 | 8/2007 | Yamada |
| 2007/0260965 A1 | 11/2007 | Schmidt et al. |
| 2007/0263711 A1 | 11/2007 | Kramer et al. |
| 2007/0283210 A1 | 12/2007 | Prasad et al. |
| 2008/0104374 A1 | 5/2008 | Mohamed |
| 2008/0159448 A1 | 7/2008 | Anim-Appiah et al. |
| 2008/0169846 A1 | 7/2008 | Lan et al. |
| 2008/0273623 A1 | 11/2008 | Chung et al. |
| 2008/0284524 A1 | 11/2008 | Kushiyama |
| 2009/0059782 A1 | 3/2009 | Cole |
| 2009/0092196 A1 | 4/2009 | Okunev |
| 2009/0132758 A1 | 5/2009 | Jiang |
| 2009/0154500 A1 | 6/2009 | Diab et al. |
| 2009/0163712 A1 | 6/2009 | Lee et al. |
| 2009/0185636 A1 | 7/2009 | Palotai et al. |
| 2009/0212861 A1 | 8/2009 | Lim et al. |

(56) References Cited

U.S. PATENT DOCUMENTS

| | | |
|---|---|---|
| 2009/0228767 A1 | 9/2009 | Oh et al. |
| 2009/0257542 A1 | 10/2009 | Evans et al. |
| 2010/0020898 A1 | 1/2010 | Stojanovic et al. |
| 2010/0046644 A1 | 2/2010 | Mazet |
| 2010/0104047 A1 | 4/2010 | Chen et al. |
| 2010/0180143 A1 | 7/2010 | Ware et al. |
| 2010/0205506 A1 | 8/2010 | Hara |
| 2010/0296550 A1 | 11/2010 | Abou Rjeily |
| 2010/0296556 A1 | 11/2010 | Rave |
| 2011/0014865 A1* | 1/2011 | Seo et al. .................. 455/23 |
| 2011/0051854 A1 | 3/2011 | Kizer et al. |
| 2011/0084737 A1 | 4/2011 | Oh et al. |
| 2011/0127990 A1 | 6/2011 | Wilson et al. |
| 2011/0235501 A1 | 9/2011 | Goulahsen |
| 2011/0268225 A1 | 11/2011 | Cronie et al. |
| 2011/0299555 A1 | 12/2011 | Cronie et al. |
| 2011/0302478 A1 | 12/2011 | Cronie et al. |
| 2011/0317559 A1 | 12/2011 | Kern et al. |
| 2012/0063291 A1 | 3/2012 | Hsueh |
| 2012/0152901 A1 | 6/2012 | Nagorny |
| 2012/0161945 A1 | 6/2012 | Single |
| 2012/0213299 A1 | 8/2012 | Cronie et al. |
| 2012/0257683 A1* | 10/2012 | Schwager et al. ............ 375/257 |
| 2013/0010892 A1 | 1/2013 | Cronie et al. |
| 2013/0051162 A1 | 2/2013 | Amirkhany et al. |
| 2014/0226455 A1 | 8/2014 | Schumacher |
| 2014/0254730 A1 | 9/2014 | Kim et al. |
| 2015/0010044 A1 | 1/2015 | Zhang |
| 2015/0078479 A1 | 3/2015 | Whitby-Stevens |
| 2015/0333940 A1 | 11/2015 | Shokrollahi |
| 2015/0381232 A1 | 12/2015 | Ulrich |
| 2016/0020824 A1 | 1/2016 | Ulrich |
| 2016/0036616 A1 | 2/2016 | Holden |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion of the International Searching Authority, mailed Nov. 5, 2012, in International Patent Application S.N. PCT/EP2012/052767, 7 pages.

International Search Report and Written Opinion of the International Searching Authority, mailed Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

International Search Report for PCT/US2014/053563, dated Nov. 11, 2014, 2 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method for the Analysis of Signals: the Square-Wave Method, Mar. 2008, Revista de Matematica: Teoria y Aplicationes, pp. 09-129.

International Search Report and Written Opinion from PCT/US2014/034220 mailed Aug. 21, 2014.

International Search Report and Written Opinion for PCT/US14/052986 mailed Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallani, L., et al., "Transmission Time Analysis for the Parallel Asynchronous Communication Scheme", IEEE Tranactions on Computers, vol. 52, No. 5, May 2003, pp. 558-571.

International Search Report and Written Opinion for PCT/EP2012/052767 mailed May 11, 2012.

International Search Report and Written Opinion for PCT/EP2011/059279 mailed Sep. 22, 2011.

International Search Report and Written Opinion for PCT/EP2011/074219 mailed Jul. 4, 2012.

Notification of Transmittal of the International Search Report and the Written Opinion of the International Searching Authority, or the Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Cheng, W., "Memory Bus Encoding for Low Power: A Tutorial", Quality Electronic Design, IEEE, International Symposium on Mar. 26-28, 2001, pp. 199-204, Piscataway, NJ.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Notification of Transmittal of International Search Report and The Written Opinion of the International Searching Authority, for PCT/US2015/018363, mailed Jun. 18, 2015, 13 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

Grahame, J., "Vintage Analog Computer Kits," posted on Aug. 25, 2006 in Classic Computing, 2 pages, http://www.retrothing.com/2006/08/classic_analog_.html.

Schneider, J., et al., "ELEC301 Project: Building an Analog Computer," Dec. 19, 1999, 8 pages, http://www.clear.rice.edu/elec301/Projects99/anlgcomp/.

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

"Introduction to: Analog Computers and the DSPACE System," Course Material ECE 5230 Spring 2008, Utah State University, www.coursehero.com, 12 pages.

Notification of Transmittal of the International Search Report and the Written Opinion of the International Searching Authority, or the Declaration, for PCT/US2014/015840, dated May 20, 2014. 11 pages.

Notification of Transmittal of the International Search Report and the Written Opinion of the International Searching Authority, or the Declaration, for PCT/US2014/043965, dated Oct. 22, 2014, 10 pages.

Notification of Transmittal of the International Search Report and the Written Opinion of the International Searching Authority, or the Declaration, dated Mar. 3, 2015, for PCT/US2014/066893, 9 pages.

(56) References Cited

OTHER PUBLICATIONS

International Preliminary Report on Patentability for PCT/US2014/015840, dated Aug. 11, 2015, 7 pages.
Jiang, A., et al., "Rank Modulation for Flash Memories", IEEE Transactions of Information Theory, Jun. 2006, vol. 55, No. 6, pp. 2659-2673.
Zouhair Ben-Neticha et al., "The 'streTched—Golay and other codes for high-SNR finite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.
Oh, et al., Pseudo-Differential Vector Signaling for Noise Reduction in Single-Ended Signaling, DesignCon 2009.

* cited by examiner

MULTIDROP DATA TRANSFER

This application claims priority to U.S. Provisional Patent Application 62/026,860, filed Jul. 21, 2014, naming Ali Hormati and Amin Shokrollahi, entitled "Multidrop Data Transfer" which is herein incorporated by reference in its entirety for all purposes.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of U.S. patent application Ser. No. 13/154,009, filed Jun. 6, 2011, naming Harm Cronie and Amin Shokrollahi, entitled "Error Control Coding for Orthogonal Differential Vector Signaling" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. Patent Publication No. 2011/0299555 of U.S. patent application Ser. No. 13/154,009, filed Jun. 6, 2011, naming Harm Cronie and Amin Shokrollahi, entitled "Error Control Coding for Orthogonal Differential Vector Signaling" (hereinafter "Cronie IV");

U.S. Provisional Patent Application No. 61/763,403, filed Feb. 11, 2013, naming John Fox, Brian Holden, Ali Hormati, Peter Hunt, John D Keay, Amin Shokrollahi, Anant Singh, Andrew Kevin John Stewart, Giuseppe Surace, and Roger Ulrich, entitled "Methods and Systems for High Bandwidth Chip-to-Chip Communications Interface" (hereinafter called "Fox I");

U.S. Provisional Patent Application No. 61/773,709, filed Mar. 6, 2013, naming John Fox, Brian Holden, Peter Hunt, John D Keay, Amin Shokrollahi, Andrew Kevin John Stewart, Giuseppe Surace, and Roger Ulrich, entitled "Methods and Systems for High Bandwidth Chip-to-Chip Communications Interface" (hereinafter called "Fox II");

U.S. Provisional Patent Application No. 61/812,667, filed Apr. 16, 2013, naming John Fox, Brian Holden, Ali Hormati, Peter Hunt, John D Keay, Amin Shokrollahi, Anant Singh, Andrew Kevin John Stewart, and Giuseppe Surace, entitled "Methods and Systems for High Bandwidth Communications Interface" (hereinafter called "Fox III");

U.S. patent application Ser. No. 13/842,740, filed Mar. 15, 2013, naming Brian Holden, Amin Shokrollahi, and Anant Singh, entitled "Methods and Systems for Skew Tolerance and Advanced Detectors for Vector Signaling Codes for Chip-to-Chip Communication" (hereinafter called "Holden I");

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences" (hereinafter called "Ulrich I").

U.S. patent application Ser. No. 14/315,306, filed Jun. 25, 2014, naming Roger Ulrich, entitled "Multilevel Driver for High Speed Chip-to-Chip Communications" (hereinafter called "Ulrich II").

U.S. Provisional Patent Application No. 61/934,804, filed Feb. 2, 2014, naming Ali Hormati and Amin Shokrollahi, entitled "Method for Code Evaluation using ISI Ratio" (hereinafter called "Hormati I").

U.S. Provisional Patent Application No. 61/992,711, filed May 13, 2014, naming Amin Shokrollahi, entitled "Vector Signaling Code with Improved Noise Margin" (hereinafter called "Shokrollahi I").

U.S. Provisional Patent Application No. 62/023,163, filed Jul. 10, 2014, naming Amin Shokrollahi and Roger Ulrich, entitled "Vector Signaling Code with Improved Noise Margin" (hereinafter called "Shokrollahi II").

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. The set of values that a symbol of the vector may take on is called the "alphabet" of the vector signaling code. A vector signaling code, as described herein, is a collection C of vectors of the same length N, called codewords. Any suitable subset of a vector signaling code denotes a "subcode" of that code. Such a subcode may itself be a vector signaling code. Orthogonal Differential Vector Signaling codes (ODVS) as described in [Cronie I] are one specific example of a vector signaling code as used in descriptions herein.

In operation, the coordinates of the codewords are bounded, and we choose to represent them by real numbers between −1 and 1. The ratio between the binary logarithm of the size of C and the length N is called the pin-efficiency of the vector signaling code.

A vector signaling code is called "balanced" if for all its codewords the sum of the coordinates is always zero. Balanced vector signaling codes have several important properties. For example, as is well-known to those of skill in the art, balanced codewords lead to lower electromagnetic interference (EMI) noise than non-balanced ones. Also, if common mode resistant communication is required, it is advisable to use balanced codewords, since otherwise power is spent on generating a common mode component that is cancelled at the receiver.

Additional examples of vector signaling methods are described in Cronie I, Cronie II, Cronie III, Cronie IV, Fox I, Fox II, Fox III, Holden I, Shokrollahi I, and Hormati I.

BRIEF DESCRIPTION

The unavoidable impedance anomalies seen in multi-drop communications channels introduce corresponding deep notches in the channel frequency response and a corresponding limitation of the effective data rate in conventional systems. This is true even if the channel spectrum after the notch does not show high attenuation and is still usable. A special time-ordered coding method is described which results in the emitted spectrum of the data stream transmitted into the channel having a notch at the same or at a similar frequency as the notch in the channel frequency response, permitting channel receivers to successfully decode the transmitted data stream.

DETAILED DESCRIPTION

It is well understood that at high data rates, communications channels must be treated as high-frequency transmission lines. As such, each connection anomaly in the communications signal path may introduce an impedance variation which causes some portion of the propagating transmit waveform to be reflected, both weakening the portion of the waveform continuing on, and producing a backwards-propagating waveform which may potentially be reflected from other impedance anomalies to produce delayed versions of the signal waveform which can distort or interfere with the primary waveform.

Figure 1:
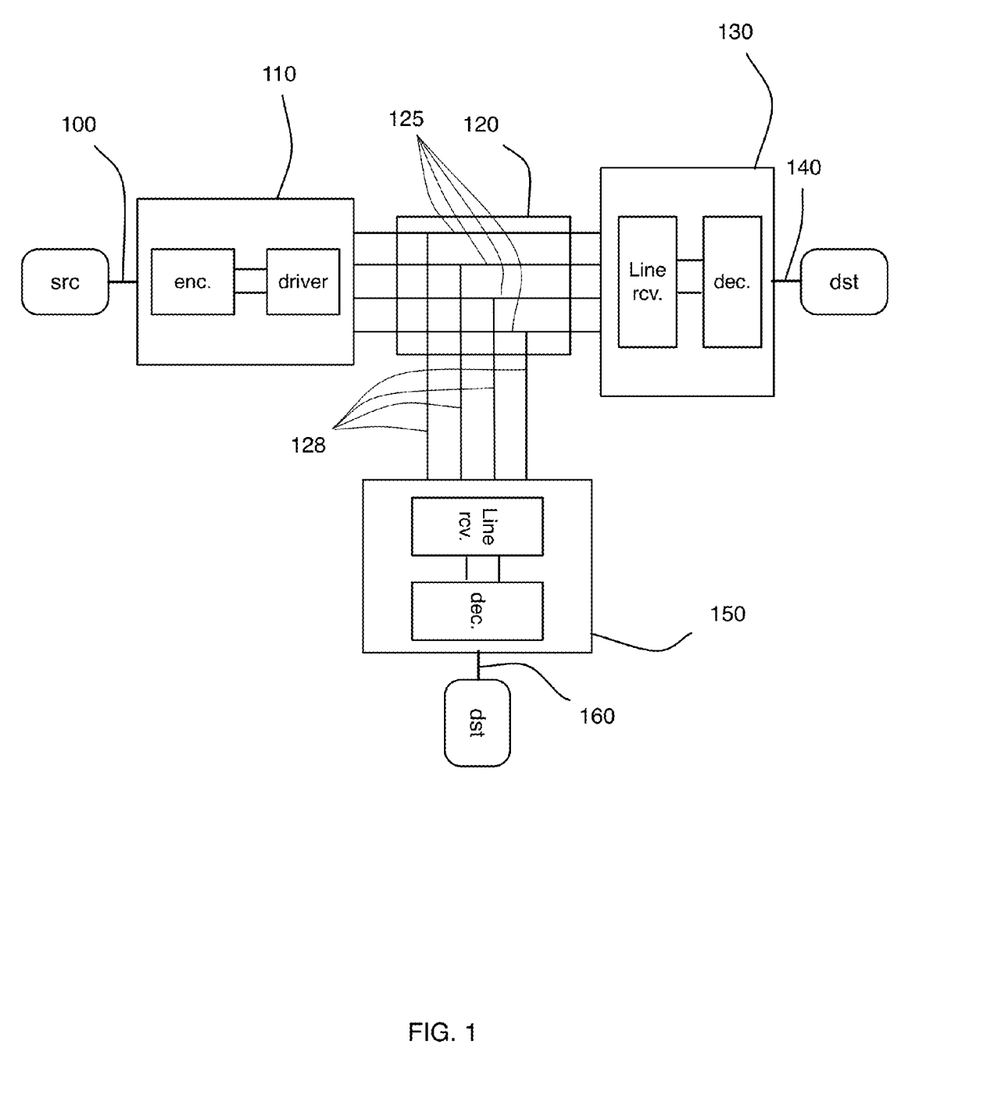
FIG. 1 illustrates a typical multidrop communications system comprising of transmitter 110 and receivers 130 and 150, interconnected by a multi-wire communications channel 120.

Multidrop communications channels such as illustrated in FIG. 1 may be profoundly impacted by such propagation issues. In the example shown, transmitting device 110 drives signals onto the wires 125 which collectively comprise communications channel 120. Receiving devices 130 and 150 are both potential recipients of such signals. However, the wires 128 through which receiving device 150 connects to communications channel 120 represents a "stub" transmission line element which represents a significant impedance anomaly in communications channel 120, as signals propagating on wires 125 must split and follow two paths to receiving devices 130 and 150.

Figure 3A:
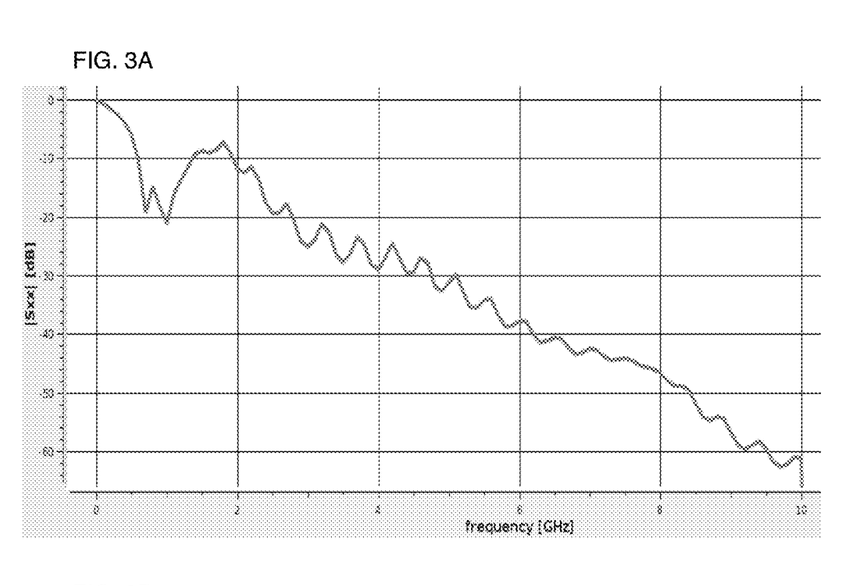
FIG. 3A shows the frequency response characteristics of an example channel, with FIG. 3B showing the same channel's impulse response.
Figure 3B:
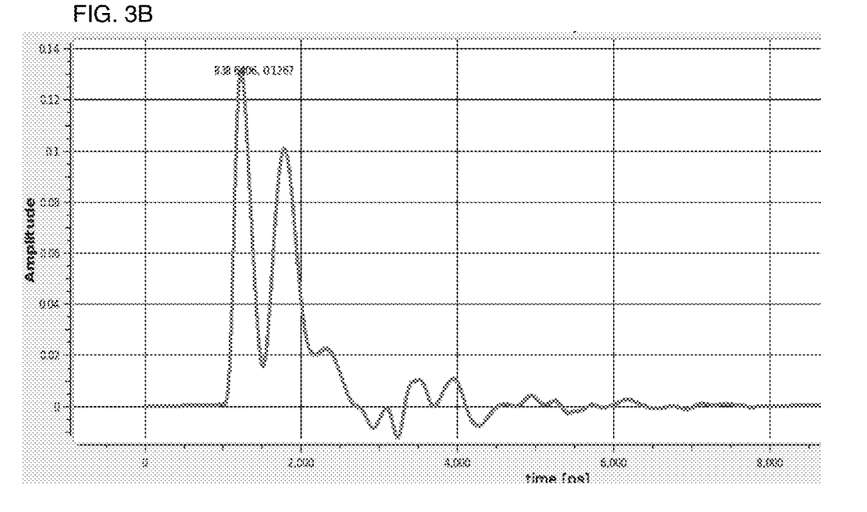

One familiar with the art will note that such a multidrop configuration will typically be associated with a notch in the frequency response characteristics measured for the channel, as shown by the graph of FIG. 3A, with the notch frequency inversely proportional to the propagation delay of the signal traversing the distance from the transmitter to the impedance anomaly, at the propagation velocity of the communications medium. In the time domain, this same effect will appear as a significant reflected signal with a time delay proportional to the distance from the transmitter to the impedance bump at the propagation velocity of the communications channel, as shown in the graph of FIG. 3B. As will be readily understood by those familiar with the art, additional multi-drop connections will exacerbate this situation, with a worst case being the uniform periodic spacing intervals seen on busses in a multi-card backplane or in a stacked chip configuration.

Basic Concept

If one attempted to transmit digital signals over such a communications medium at varying data rates, one would observe that the "goodput" (i.e. the rate at which good or non-disrupted data is received) over the medium varies significantly, with particularly poor transmission characteristics occurring at rates at or above the notch frequencies of the frequency response. In the time domain, this may be interpreted as the transmitted signal appearing at a receiver simultaneous with a delayed version of a previously transmitted signal, resulting in a marginal or corrupted detection result.

Conversely, it is observed that if the transmission rate is set to an integer multiple of the notch frequency so as to create a "frame" of N data units $D_1, \ldots, D_N$, the data unit transmission interfering with, as an example, data unit $D_N$ must be one of the earlier-transmitted data units $D_1, \ldots, D_{N-1}$. Knowing the data to be transmitted in $D_N$ allows a value to be chosen for transmission in the earlier (e.g. interfering) time interval which will constructively interact with $D_N$ to facilitate its reception, one example being transmission of the same channel signal value during both the earlier and later time intervals. Alternatively, a value may be transmitted in the earlier time interval which will not impact reception of $D_N$, an example being transmission of a quiescent or "zero" value on a channel where the data signals are +1 and −1, another example being the inverse of the data, if the delayed interfering signal is also inverted.

Sequentially Transmitted Data Frame

A first embodiment utilizes a data frame whose period T is equal to $1/f_{notch}$, where $f_{notch}$ is the frequency of the first notch in the channel's frequency response. The frame is divided into 2*M partitions of equal duration, where M is an integer typically greater than one, the sequence of partitions representing the consecutively transmitted signal unit intervals for the data stream. The first half of the frame may be herein referred to as the first transmit frame of M symbols. The second half of the frame may be herein referred to as the subsequent transmit frame of M symbols The general form of this frame is:

| Time | T = 0 | | | | | | | T = $1/F_{notch}$ |
|------|-------|-----|-----|-----|-----|-----|-----|-------|
| Data | $D_1$ | $D_2$ | $D_3$ | ... $D_M$ | $D_1$ | $D_2$ | $D_3$ | ... $D_M$ | where $D_i$ represents the levels of the signaling scheme used for the transmission, e.g, ±1 for binary data transmission, and each of the M data units $D_1, \ldots, D_M$ are transmitted twice, with the same sequence of M transmissions emitted in the first transmit frame being repeated in the same order in the subsequent transmit frame, resulting in an overall throughput equal to M $f_{notch}$. As one familiar with the art will observe, the frequency spectrum of such a periodically repeating message format has notches at frequencies (2K+1) $f_{notch}$ and therefore, we can recover the data sequence $D_1, D_2, D_3, \ldots, D_M$ successfully at the receiver by sampling at $(2*M)*f_{notch}$ rate, discarding the first set of M samples (i.e. those in the first transmit frame,) and keeping the subsequent set of M samples as representing $D_1, \ldots, D_M$.

Figure 2:
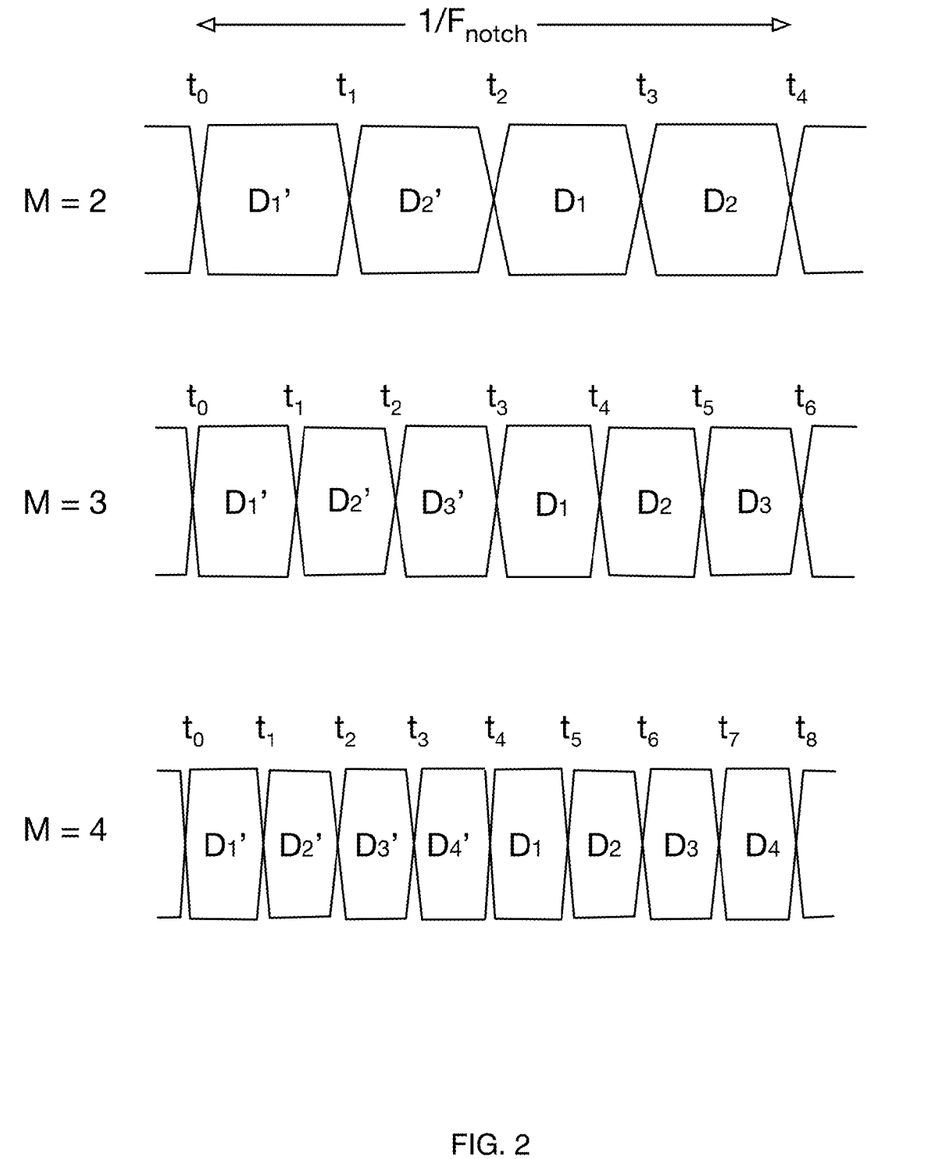
FIG. 2 illustrates data frame sequences in accordance with at least one embodiment using different rate multiplier values M.

This data frame sequence is also illustrated in FIG. 2, where binary data transmissions are shown with M=2, M=3, and M=4. The sequential data values being transmitted in the subsequent transmit frame are shown as $D_1, \ldots, D_M$ and the compensatory values being transmitted in the first transmit frame are shown as $D_1', \ldots, D_M'$. Thus for the M=2 example, the raw transmission rate is $4*f_{notch}$ with each of data units $D_1$ and $D_2$ being transmitted twice within the data frame spanning time $t_0$ to time $t_3$, with the overall duration of the frame being $1/f_{notch}$ as shown.

In the time domain, a multidrop channel with a notch at $f_{notch}$ adds a delayed and attenuated version of the input signal to itself where the delay is equal to $t=1/(2*f_{notch})$. Looking at our data frame, it is obvious that while the data elements transmitted during the first transmit frame will interfere with data elements of the subsequent transmit, forming a channel-induced superposition. This channel-induced superposition may be made additive with the described timing and repetitive data transmission, thus providing an increased receiver eye opening.

Alternative Embodiments

An alternative embodiment transmits one half frame of zeroes or a comparable quiescent channel signal in the first transmit frame, and data in the subsequent transmit frame, thus damping out the interfering delayed signals. Thus, referring to FIG. 2, in this embodiment the compensatory values $D_1', \ldots, D_M'$ would be zeroes. However, such an embodiment will present a smaller receive eye vertical opening than the previously-described method of sending each data value twice, as there is no constructive interference to boost the received signal. It may be noted that with this method the receiver will also see signals in the first half of the subsequent frame including an immediate zero value and a delayed data value from the second half of the previous frame, providing an opportunity for an embodiment making two independent observations of the same set of M bits.

A further alternative embodiment transmits one half frame of inverted data values in the first transmit frame, followed by one half frame of non-inverted data values in the subsequent transmit frame, providing a channel-induced superposition representing constructive interference in situations where the interfering delayed signal is inverted by reflection. Referring again to FIG. 2, in this embodiment the compensatory values $D_1', \ldots, D_M'$ would be the logical inverse of the values transmitted as $D_1, \ldots, D_M$.

As will be apparent to one familiar with the art, equivalent patterns for the data frame include data followed by inverted data, data followed by zeroes, etc.

Additional Variations

It should be noted that the described embodiments are applied per-wire, thus may be combined with known multi-wire coding schemes in an obvious way, i.e. transmitting sequences of codewords of a vector signaling code on multiple wires rather than single bits on one wire, and repeating the sequence of codewords during the second half of the frame. Similarly, although the examples provided illustrate binary channel signaling for descriptive convenience, no limitation is implied as present embodiment are directly applicable to ternary, quaternary, and higher-order signaling as well.

Because the transmission rate for the data frame is determined based on the channel notch frequency, the notch frequency will ideally be known at least approximately before-hand. For common configurations such as backplanes, stacked chips, etc. the physical dimensions and composition of the channel is fixed, and its expected characteristics are thus well known. Alternatively, other embodiments may measure the channel and set the communications data rate as part of a setup or initialization procedure for the circuit, the channel measurement either being performed directly as a signal strength vs. frequency plot, or indirectly by measuring pulse reflection times (i.e. as a time-domain reflectometer or TDR measurement.)

Some embodiments may maintain individual channel compensation parameters per receiver or set of receivers, so as to optimize reception for the anticipated, calculated, or measured reflection combinations at those particular receiver locations. Other embodiments may use a consensus or average compensation parameters for all receivers. These compensation parameters may include the notch frequency, multiplication factor M, and format of the data frame, including polarity and type of corrective signals incorporated in it. The compensation parameters may differ for different transmitters; as one particular example, the characteristics of the channel and thus the preferred compensation parameters may not be symmetric in both directions.

In practical embodiments, the transmission rate may merely approximate the optimal $2*M*f_{notch}$ rate with only modest reduction in received signal quality, determined in part by the depth and width of the channel notch.

Illustrated Results

Figure 4A:
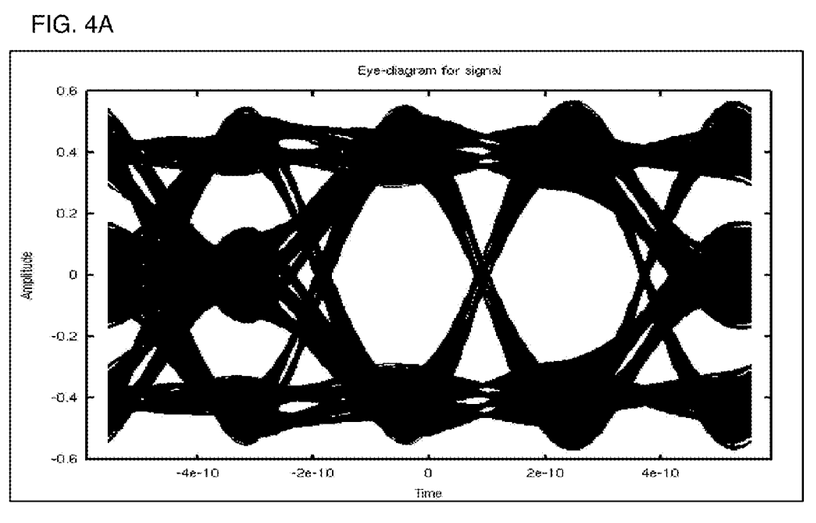
FIG. 4A is a receive eye diagram for one embodiment using the channel of FIG. 3A with M=2.
Figure 4B:
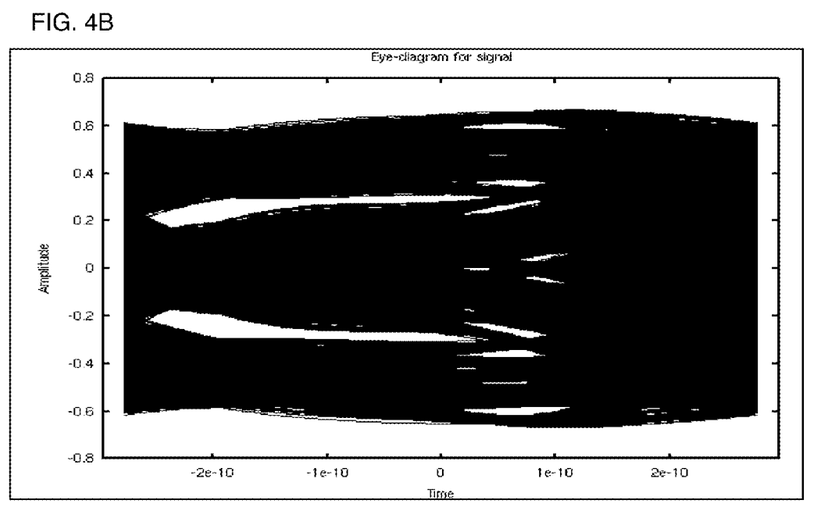
FIG. 4B is a receive eye diagram of the same channel and raw signaling rate, without benefit of described embodiments.

An embodiment having a channel with a frequency response notch at approximately 900 MHz as shown in the graph of FIG. 3A was used with a data frame where M=2, resulting in a raw transmit data rate of 1.8 Gbps. A transmit FIR filter was used equal to [0.7, −0.3]. The receive eye diagram in this configuration is shown as FIG. 4A. For comparison, the receive eye diagram when sending arbitrary data (i.e. without the described data frame and its duplicated transmissions) at 1.8 Gbps over this channel is shown as FIG. 4B, showing significantly poorer signal reception relative to the described signaling method.

Figure 5:
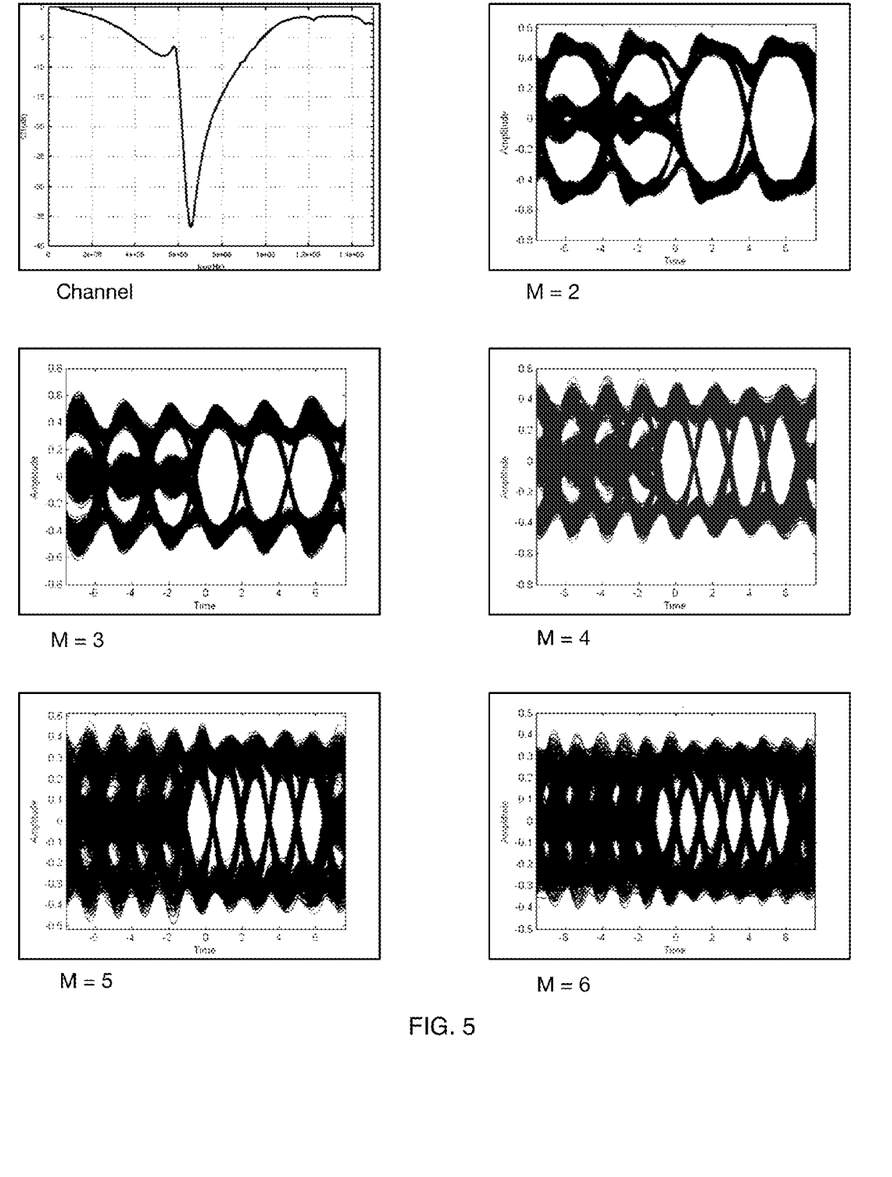
FIG. 5 shows the frequency response characteristics of another example channel, and receive eye diagrams for an embodiment utilizing different values of rate multiplier M.

FIG. 5 illustrates the performance characteristics of another embodiment. The deeply notched frequency response characteristics of the channel used by this embodiment is shown in the first graph labeled "Channel", with subsequent graphs labeled "M=2" through "M=6" showing the receiver eyes for transmission across that channel with increasing values of M.

Further Embodiments

The following descriptions use the term "delta" as a relative metric of the depth of the frequency response notch for the channel, with delta=1 for a very deep notch and delta=0 for no notch at all.

In a further embodiment using single-ended NRZ coding, a previously-described example data frame of [d1 d2 d1 d2] is replaced by a data frame of [d1 d2 d1 d2 d3 d4]. Bits d1 and d2 (at positions 3 and 4) can be decided directly and bits d3 and d4 can be decided with known Decision Feedback Equalization (DFE) techniques at the receiver. Detection of d3 needs to know d1 (the earlier signal interfering with it) and, similarly, detecting d4 needs to know d2. DFE allows these earlier received signals to be subtracted from the present sample, leaving a disambiguated sample to be detected. In this embodiment, the frame length (the duration in time of [d1 d2 d1 d2 d3 d4]) is set to $1.5/f_{notch}$ allowing data transmission at the rate of $4/1.5*f_{notch}=2.66*f_{notch}$. The DFE level depends on delta and can be set adaptively. The same technique works with a data frame structured as [0 0 d1 d2 d3 d4].

A second further embodiment uses a 5-level driver, and sends the sequence [a b a b c-a d-b] in $1.5/f_{notch}$ time. As one familiar with the art will note, the expected receive sequence will thus be [junk, junk, a*(1+delta), b*(1+delta), c-a*(1-delta), d-b*(1-delta)]. If delta is close to 1 (e.g. -20 dB or so), then the vertical opening of c-a*(1-delta), d-b*(1-delta) is slightly smaller than the normal vertical opening (same for the horizontal opening), and the symbols are principally binary (thus, according to the teachings of [Hormati I], ISI ratio=1.) This embodiment allows 4 bits to be sent in $1.5/f_{notch}$ time, so in total $2.666*f_{notch}$ bits/second/wire.

A third further embodiment is applicable if the reflection is not so powerful, i.e. delta is, for example, on the order of 0.3. In this embodiment, a Tx FIR of [1 0-delta] is used to filter the transmitted data. On the receiver side, one obtains data in the form $d2-delta^2$ $d0\sim=d2$ and since delta is small, it will not close the eyes considerably. Prior knowledge or measurement of delta is needed by this embodiment.

If delta is close to 1 (i.e. a deep notch), a fourth further embodiment uses frames like [d0 d1 d0 d1 (d0*d2) (d1*d3) (d0*d2*d4) (d1*d3*d5)] over $2/f_{notch}$, sending data at the rate of $6/2*f_{notch}=3*f_{notch}$. On the receiver side, the first two UIs in this frame get corrupted by the previous frame. Bits d0 and d1 at positions 3 and 4 can be extracted by PAM2 detection. For the next bit we obtain d0*d2+delta*d0=d0*(delta+d2)~=d0*(1+d2). One can extract d2 by performing a PAM3 detection to see if d0*(1+d2) is zero or not. If zero, d2=-1 otherwise, d2=1. In the same way, one can obtain bits d3, d4 and d5. As a further advantage, this technique limits the error propagation.

Embodiments

Figure 6:
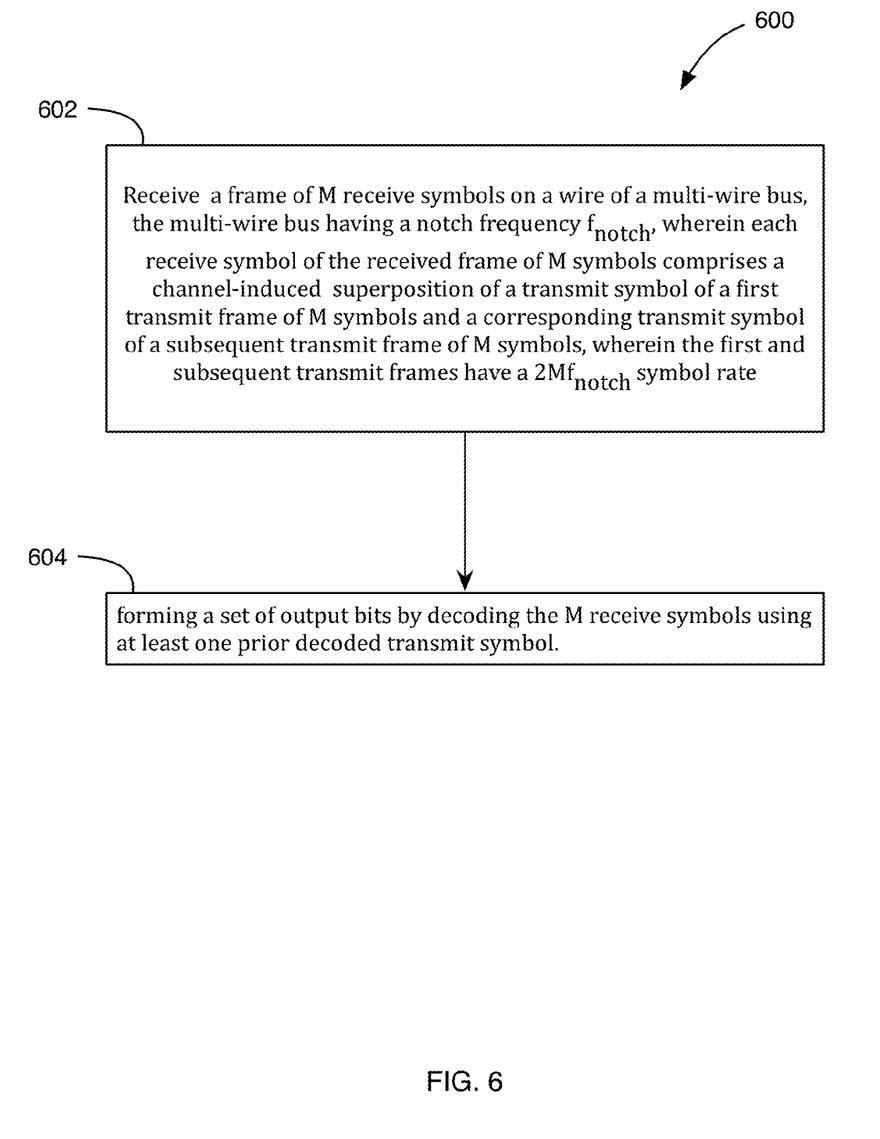
FIG. 6 is a flowchart of a process in accordance with at least one embodiment.

As shown in FIG. 6, a method 600 in accordance with at least one embodiment comprises receiving, at step 602, a frame of M receive symbols on a wire of a multi-wire bus, the multi-wire bus having a notch frequency $f_{notch}$, wherein each receive symbol of the received frame of M symbols comprises a channel-induced superposition of a transmit symbol of a first transmit frame of M symbols and a corresponding transmit symbol of a subsequent transmit frame of M symbols, wherein the first and subsequent transmit frames have a $2*M*f_{notch}$ symbol rate, and, forming, at step 604, a set of output symbols by decoding the M receive symbols using at least one prior decoded transmit symbol.

In at least one embodiment, first transmit frame of M symbols is equal to the subsequent transmit frame of M symbols.

In at least one embodiment, the first transmit frame of M symbols comprises all quiescent symbols.

In at least one embodiment, the first transmit frame of M symbols is an inverted version of the subsequent transmit frame of M symbols.

In at least one embodiment, the first transmit frame of M symbols and the subsequent transmit frame of symbols are distinct. In at least one embodiment, the first transmit frame of M symbols comprises at least one prior decoded transmit symbol, and the decoding the M receive symbols comprises forming at least one output symbol based on the superposition of the at least one prior decoded transmit symbol and the corresponding transmit symbol of the subsequent transmit frame In at least one embodiment, the notch frequency is determined by an impedance anomaly.

In at least one embodiment, the impedance anomaly is represented as multiple receivers connected to the multi-wire data bus.

In at least one embodiment, the corresponding transmit symbol represents a combination of at least 2 distinct symbols.

Figure 7:
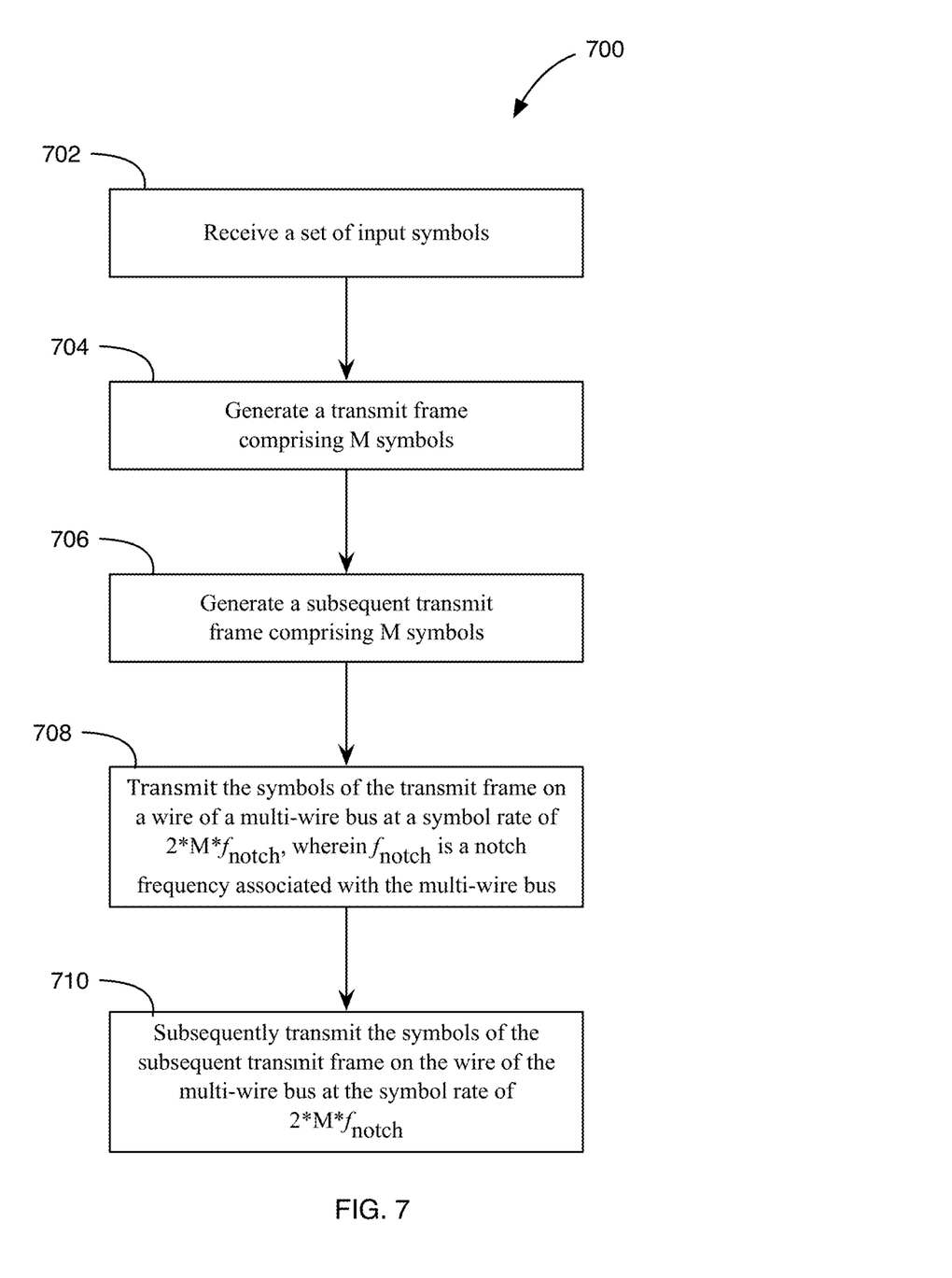
FIG. 7 is a flowchart of another process in accordance with at least one embodiment.

As shown in FIG. 7, a method 700 in accordance with at least one embodiment comprises receiving, at step 702, a set of input symbols, generating, at step 704, a transmit frame comprising M symbols, generating, at step 706, a subsequent transmit frame comprising M symbols, transmitting, at step 708, the symbols of the transmit frame on a wire of a multi-wire bus at a symbol rate of $2*M*f_{notch}$, wherein $f_{notch}$ is a notch frequency associated with the multi-wire bus, and, subsequently transmitting, at step 710, the symbols of the subsequent transmit frame on the wire of the multi-wire bus at the symbol rate of $2*M*f_{notch}$.

In at least one embodiment, an apparatus comprises a wire of a multi-wire bus configured to receive a frame of M receive symbols, the multi-wire bus having a notch frequency $f_{notch}$, wherein each receive symbol of the received frame of M symbols comprises a channel-induced superposition of a transmit symbol of a first transmit frame of M symbols and a corresponding transmit symbol of a subsequent transmit frame of M symbols, wherein the first and subsequent transmit frames have a $2*M*f_{notch}$ symbol rate, and, a decoder configured to form a set of output symbols by decoding the M receive symbols using at least one prior decoded transmit symbol.

In at least one embodiment the first transmit frame of M symbols is equal to the subsequent transmit frame of M symbols.

In at least one embodiment the first transmit frame of M symbols comprises all quiescent symbols.

In at least one embodiment the first transmit frame of M symbols represents an inverted version of the subsequent transmit frame of M symbols.

In at least one embodiment the first transmit frame of M symbols and the subsequent transmit frame of symbols are distinct.

In at least one embodiment the first transmit frame of M symbols comprises at least one prior decoded transmit symbol, and the decoder is further configured to generate at least one output symbol based on the superposition of the at least one prior decoded transmit symbol and the corresponding transmit symbol of the subsequent transmit frame.

In at least one embodiment the notch frequency is determined by an impedance anomaly.

In at least one embodiment the impedance anomaly is represented as a plurality of receivers connected to the multi-wire data bus.

In at least one embodiment the apparatus further comprises a set of input wires, each input wire configured to receive a set of input symbols, an encoder configured to generate a transmit data frame comprising M symbols and a subsequent transmit data frame comprising M symbols, and a driver configured to transmit the symbols of the transmit data frame on the wire of the multi-wire bus at a symbol rate of $2*M*f_{notch}$, wherein $f_{notch}$ is a notch frequency associated with the multi-wire bus and subsequently transmit the symbols of the subsequent transmit data frame at the symbol rate of $2*M*f_{notch}$.

In at least one embodiment the corresponding transmit symbol represents a combination of at least 2 input symbols.

The examples provided herein describe interconnection of a transmitting device and multiple receiving devices in a multi-drop networked configuration for descriptive simplicity. However, this should not been seen in any way as limiting the scope of the described embodiments. The methods disclosed in this application are equally applicable to other interconnection topologies having significant frequency response notches and other communications protocols including full-duplex as well as half-duplex and simplex communications. Similarly, wired communications are used as illustrative examples, the embodiments also being applicable to other communication media including optical, capacitive, inductive, and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon configured to convey information. Physical signals may be tangible and non-transitory.

We claim:

1. A method comprising:
   receiving a frame of M receive symbols on a wire of a multi-wire bus, the multi-wire bus having a notch frequency $f_{notch}$, wherein each receive symbol of the received frame of M symbols comprises a channel-induced superposition of transmit symbols of a first transmit frame of M symbols and corresponding transmit symbols of a subsequent transmit frame of M symbols, wherein (i) each receive symbol of the received frame of M symbols has a symbol transmission rate of $2*M*f_{notch}$, (ii) the symbol transmission rate causes symbol boundary alignment in the channel-induced superposition of the transmit symbols of the first transmit frame and the corresponding transmit symbols of the subsequent transmit frame, and (iii) M is an integer greater than or equal to one; and,
   forming a set of output symbols by decoding the M receive symbols using at least one prior decoded transmit symbol of the first transmit frame to reverse the channel-induced superposition and obtain the subsequent transmit frame.

2. The method of claim 1, wherein the first transmit frame of M symbols is equal to the subsequent transmit frame of M symbols.

3. The method of claim 1, wherein the first transmit frame of M symbols comprises all quiescent symbols.

4. The method of claim 1, wherein the first transmit frame of M symbols is an inverted version of the subsequent transmit frame of M symbols.

5. The method of claim 1, wherein the first transmit frame of M symbols and the subsequent transmit frame of M symbols are distinct.

6. The method of claim 5, wherein the first transmit frame of M symbols comprises at least one prior decoded transmit symbol, and the decoding the M receive symbols comprises forming at least one output symbol based on the superposition of the at least one prior decoded transmit symbol and the corresponding transmit symbol of the subsequent transmit frame.

7. The method of claim 1, wherein the notch frequency is determined by an impedance anomaly.

8. The method of claim 7, wherein the impedance anomaly is represented as multiple receivers connected to the multi-wire data bus.

9. The method of claim 1, wherein the corresponding transmit symbols represents a combination of at least 2 distinct symbols.

10. A method comprising:
    obtaining a measured notch frequency $f_{notch}$ associated with a multi-wire bus;
    setting a symbol transmission rate to $2*M*f_{notch}$, wherein M is an integer greater than or equal to 1;
    receiving a set of input symbols, and responsively generating a transmit frame comprising M symbols and generating a subsequent transmit frame comprising M symbols;
    transmitting the symbols of the transmit frame on a wire of the multi-wire bus at the symbol transmission rate of $2*M*f_{notch}$; and,
    subsequently transmitting the symbols of the subsequent transmit frame on the wire of the multi-wire bus at the symbol transmission rate of $2*M*f_{notch}$, forming a frame of M symbols corresponding to a channel-induced superposition of the transmit frame and the subsequent transmit frame on the wire of the multi-wire bus.

11. The method of claim 10, wherein the measured notch frequency is found by measuring signal strength with respect to frequency on the multi-wire bus.

12. The method of claim 10, wherein the measured notch frequency is found by measuring pulse reflection times on the multi-wire bus.

13. The method of claim 12, wherein the pulse reflection times are measured using a time-domain reflectometer.

14. An apparatus comprising:
    a wire of a multi-wire bus configured to receive a frame of M receive symbols, the multi-wire bus having a notch frequency $f_{notch}$, wherein each receive symbol of the received frame of M symbols comprises a channel-induced superposition of transmit symbols of a first transmit frame of M symbols and corresponding transmit symbols of a subsequent transmit frame of M symbols, wherein (i) each receive symbol of the received frame of M symbols has a symbol transmission rate of $2*M*f_{notch}$, (ii) the symbol transmission rate causes symbol boundary alignment in the channel-induced superposition of the transmit symbols of the first transmit frame and the corresponding transmit symbols of the subsequent transmit frame, and (iii) M is an integer greater than or equal to one; and,
    a decoder configured to form a set of output symbols by decoding the M receive symbols using at least one prior decoded transmit symbol of the first transmit frame to reverse the channel-induced superposition and obtain the subsequent transmit frame.

15. The apparatus of claim 14, wherein the first transmit frame of M symbols is equal to the subsequent transmit frame of M symbols.

16. The apparatus of claim 14, wherein the first transmit frame of M symbols comprises all quiescent symbols.

17. The apparatus of claim 14, wherein the first transmit frame of M symbols represents an inverted version of the subsequent transmit frame of M symbols.

18. The apparatus of claim 14, wherein the first transmit frame of M symbols and the subsequent transmit frame of M symbols are distinct.

19. The apparatus of claim 18, wherein the first transmit frame of M symbols comprises at least one prior decoded transmit symbol, and the decoder is further configured to generate at least one output symbol based on the superposition of the at least one prior decoded transmit symbol and the corresponding transmit symbol of the subsequent transmit frame.

20. The apparatus of claim 14, wherein the notch frequency is determined by an impedance anomaly.

21. The apparatus of claim 20, wherein the impedance anomaly is represented as a plurality of receivers connected to the multi-wire data bus.

22. The apparatus of claim 14, further comprising:
a set of input wires, each input wire configured to receive a set of input symbols;
an encoder configured to generate a transmit data frame comprising M symbols and a subsequent transmit data frame comprising M symbols; and,
a driver configured to transmit the symbols of the transmit data frame on the wire of the multi-wire bus at a symbol rate of $2*M*f_{notch}$, wherein $f_{notch}$ is a notch frequency associated with the multi-wire-bus and subsequently transmit the symbols of the subsequent transmit data frame at the symbol rate of $2*M*f_{notch}$.

23. The apparatus of claim 22, wherein the corresponding transmit symbols represents a combination of at least 2 input symbols.

* * * * *